United States Patent
Lampson

(10) Patent No.: US 7,248,248 B2
(45) Date of Patent: Jul. 24, 2007

(54) POINTING SYSTEM FOR PEN-BASED COMPUTER

(75) Inventor: Butler W. Lampson, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 709 days.

(21) Appl. No.: 10/216,431

(22) Filed: Aug. 12, 2002

(65) Prior Publication Data

US 2004/0027338 A1  Feb. 12, 2004

(51) Int. Cl.
 *G09G 5/00* (2006.01)
(52) U.S. Cl. ............... 345/173; 345/179; 345/156
(58) Field of Classification Search ......... 345/173, 345/179, 156, 840; 382/187; 361/681; 708/142
 See application file for complete search history.

(56) References Cited

U.S. PATENT DOCUMENTS

| | | | | |
|---|---|---|---|---|
| 4,972,496 A * | 11/1990 | Sklarew | ........................ | 381/187 |
| 5,007,085 A * | 4/1991 | Greanias et al. | ............... | 726/34 |
| 5,194,852 A * | 3/1993 | More et al. | .................. | 345/182 |
| 5,375,076 A * | 12/1994 | Goodrich et al. | ............ | 361/681 |
| 5,543,588 A * | 8/1996 | Bisset et al. | ............. | 178/18.06 |
| 5,568,603 A * | 10/1996 | Chen et al. | .................. | 715/784 |
| 5,825,675 A * | 10/1998 | Want et al. | .................. | 708/142 |
| 5,900,875 A * | 5/1999 | Haitani et al. | ............... | 345/840 |
| 6,020,878 A * | 2/2000 | Robinson | ..................... | 345/173 |
| 6,054,979 A * | 4/2000 | Sellers | ........................ | 345/173 |
| 6,107,997 A * | 8/2000 | Ure | .............................. | 345/173 |
| 6,243,071 B1 * | 6/2001 | Shwarts et al. | ............. | 715/823 |
| 6,295,052 B1 * | 9/2001 | Kato et al. | ................... | 345/179 |
| 6,381,126 B1 * | 4/2002 | Yoshimoto et al. | ......... | 361/683 |
| 6,388,877 B1 * | 5/2002 | Canova et al. | ............. | 361/686 |
| 6,429,846 B2 * | 8/2002 | Rosenberg et al. | ......... | 345/156 |
| 6,498,601 B1 * | 12/2002 | Gujar et al. | ................ | 345/173 |
| 6,727,892 B1 * | 4/2004 | Murphy | ...................... | 345/173 |
| 6,771,250 B1 * | 8/2004 | Oh | .............................. | 345/156 |
| 6,829,372 B2 * | 12/2004 | Fujioka | ...................... | 382/103 |
| 7,009,599 B2 * | 3/2006 | Pihlaja | ....................... | 345/173 |

\* cited by examiner

*Primary Examiner*—Guy Lamarre
*Assistant Examiner*—Fritz Alphonse
(74) *Attorney, Agent, or Firm*—Banner & Witcoff, Ltd.

(57) ABSTRACT

A secondary input system for a pen-based computer allows users to control a graphical user interface without the use of a stylus. The secondary input system may be in the form of a pointing system. A display surface may be attached to a housing in which the display surface is sensitive to input of a pen device. The pointing system includes a secondary input system on housing in which the input device is responsive to movement of a finger of a user for controlling the graphical user interface. The input device may be a point stick device, a touchpad, or other device that provides two-dimensional movement of a graphical object on the display surface. The secondary input system may be automatically activated or deactivated based on proximity sensing of a stylus or pen with respect of the display surface.

32 Claims, 8 Drawing Sheets

POINTING SYSTEM FOR PEN-BASED COMPUTER

FIELD OF THE INVENTION

Aspects of the present invention are directed generally to systems and methods for controlling a graphical user interface (GUI). Specifically, aspects of the present invention relate to providing systems and methods to allow users to control a graphical user interface on a pen-based computer.

BACKGROUND OF THE INVENTION

Conventional computer systems, especially computer systems using graphical user interface (GUI) systems, accept user input from a conventional input device, such as a keyboard for entering text, and a pointing device, such as a mouse for operating the graphical user interface. The ubiquitous keyboard and mouse interface provides for creation and modification of electronic documents, spreadsheets, database fields, drawings, photos and the like.

One common use of computers and GUIs is to generate and edit electronic documents. These electronic documents can contain text (e.g., electronic word processors) and/or images (e.g., pictures), which are displayed on the user's screen for editing. To interact with these onscreen objects, the user typically uses the mouse to move an onscreen pointer to the desired object, and presses a button on the mouse to select the object. Further the user may use the mouse to control the operation of the GUI. In another method, a point stick is embedded in about the center of a keyboard of a notebook computer, centered relative to the "G", "H", "B" and "N" keys. When a user presses against the distal end of the stick with a finger, the pressure direction and force are detected by individual sensors at the stick location, and the sensors generate signals similar that of mouse movement. The mouse and point stick location do not work effectively in pen-based computing environments due to the different form factors and significantly different operating environments.

The introduction of pen-based computing devices has changed the traditional view of the GUI, and the manner in which users can interact with their computers. While there are a number of designs, a pen-based computing device is generally interacted by way of a writable surface and a pen. The writable surface may be a display surface or a writing pad. Rather than a standard keyboard or mouse interface, the navigation and control of the GUI occurs via the pen. While pen-based computers have been helpful, these known pen-based computers have several drawbacks, which significantly limit their effectiveness as discussed below.

One such drawback exists in the input mechanism for a pen-based computer. Some pen-based computing devices requires a specialized pen device to interact with digitizer. One problem with these type of specialized pen device configurations is that if, the user misplaces the specialized pen device or the pen device is otherwise not usable, there is no effective way to interact with or control the graphical user interface. As a result, this configuration significantly reduces the usability of the pen-based computing device. Sometimes an operator may resort to using one of their fingers to point on a display to compensate for a lost pen. While it may provide some help for a digitizer that is pressure sensitive, this undesirable operation risks damage to the display surface from the oils or other materials on the fingers. Furthermore, for certain classes of digitizers, a human finger on the display is unavailing, because the digitizer does not recognize any object besides the specialized pen. As a result, the pen-based computer is rendered nearly unusable. These limitations are magnified when the device is used by a segment of the population who may be amputees or have less than full use or their arms and fingers, but still want the benefits of a pen-based computer.

Some pen-computing devices have input buttons in locations that cause musculoskeletal discomfort and fatigue. For example, one handheld design includes a "paging" button on the front face. Unfortunately, buttons or other input devices mounted on the front face of the device may have undesirable drawbacks for the user and do not effectively take in account the ergonomics for specific uses of the devices. Some configurations can create awkward and inefficient position for the hands and fingers, which may contribute to discomfort and fatigue of the user.

Accordingly, there is a need for an improved approach to provide an input system in a pen-based computing environment that can overcome one or more of the deficiencies identified above.

SUMMARY OF THE INVENTION

Aspects of the present invention pertain to systems and methods to allow users to control a graphical user interface on a pen-based computer with an on-board secondary input system.

Aspects of the present invention provide a computer system, such as a tablet, including a housing and a processor within the housing. A display surface may be attached to the housing and is sensitive to a movable input device, such as a stylus. A secondary input system is provided on and/or in the housing in which the secondary input system may include a pointing device that is responsive to movement of a finger of a user for controlling a graphical user interface. The pointing device may be a point stick device, a touchpad, or other device that provides one or two-dimensional movement of a graphical object on the display surface.

In an aspect, the secondary input system may be activated or deactivated based on proximity sensing of a stylus with respect of the display surface and/or sensor in the housing. In one aspect, the secondary input system may be located on a portion of the housing opposite the display surface. This configuration may provide finger control and ergonomic benefits when the computer system is operated in a hand held position. In another aspect, the secondary input system may be located on a housing side surface. This may help the user when, e.g., the computer is used for reading electronic books or placed on a flat surface. Thus, aspects of the present invention render a pen-based computer usable, even when the pen device is unavailable, undesired, or lost.

The above and other aspects, features and advantages of the present invention will be readily apparent and fully understood from the following detailed description illustrative embodiments in conjunction with the accompanying drawings, which are included by way of example, and not by way of limitation with regard to the claimed invention.

DETAILED DESCRIPTION OF ILLUSTRATIVE EMBODIMENTS

Illustrative Operating Environment

A secondary input system of the present invention may be described in the general context of apparatus and computer-executable instructions, such as program modules, executed by one or more computers or other devices. Generally, program modules include routines, programs, objects, components, data structures, etc. that perform particular tasks or implement particular abstract data types. As noted above, the present invention relates to the selection of graphical objects displayed by a computer system. Accordingly, it may be helpful for a better understanding of the invention to briefly discuss the components and operation of a general purpose computing environment on which various aspects of the present invention may be implemented. Such an illustrative computer system is illustrated in FIG. 1.

Figure 1:
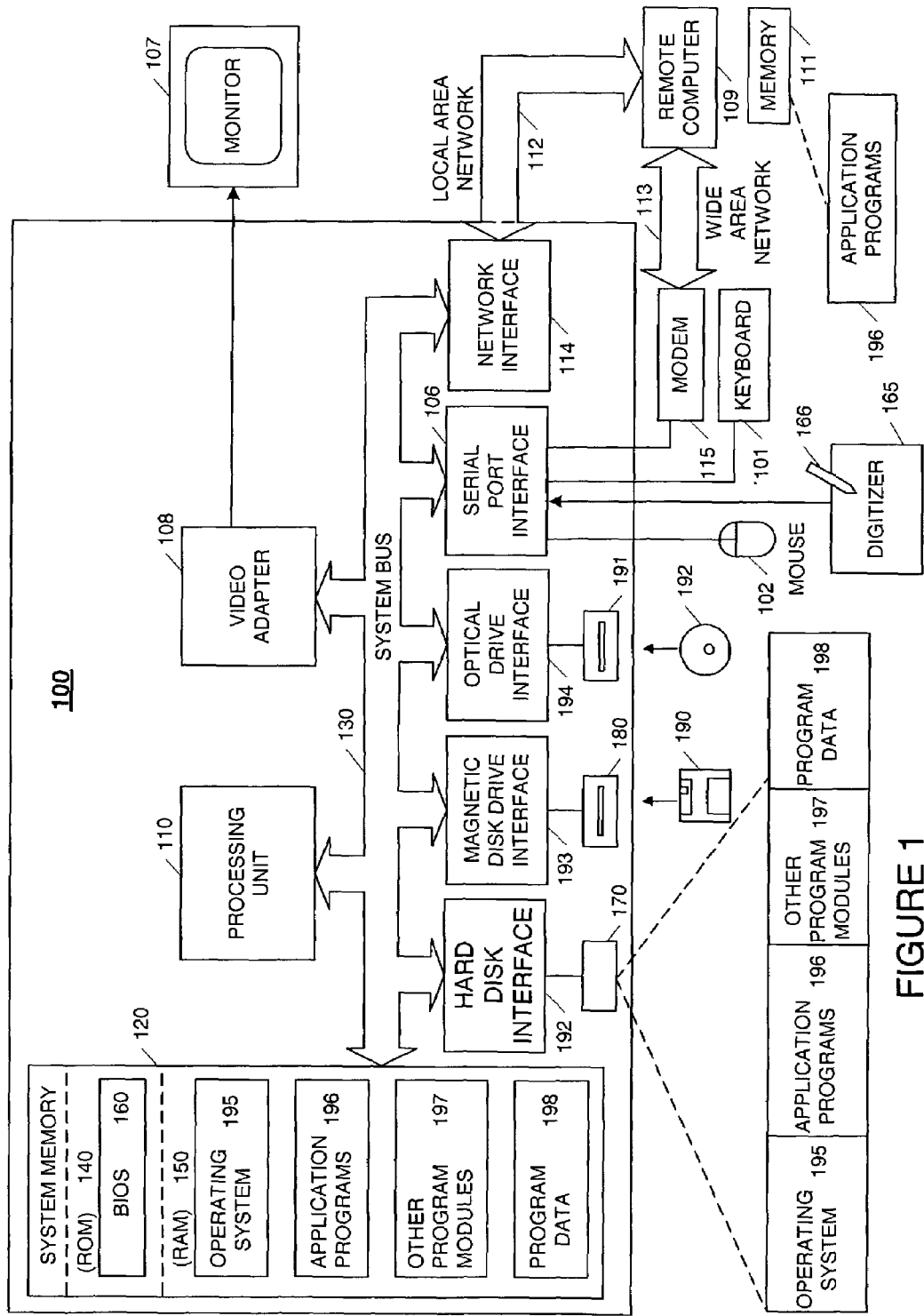
FIG. 1 is a functional block diagram of an illustrative general-purpose digital computing environment in which one or more aspects of the present invention may be implemented.

Accordingly, FIG. 1 illustrates a schematic diagram of an illustrative general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108.

In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and may include many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-swide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
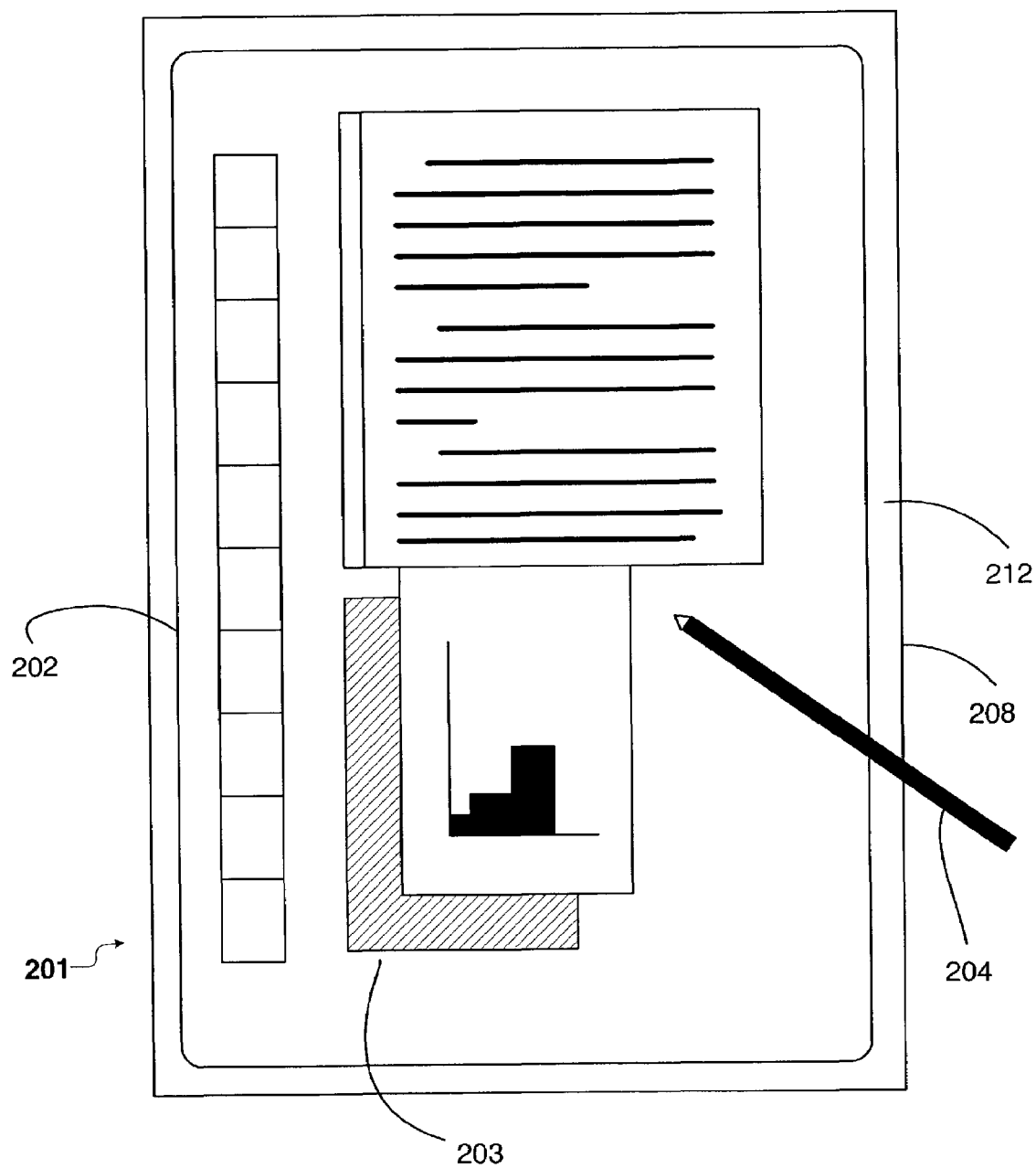
FIG. 2 is a front plan view of an illustrative tablet personal computing (PC) environment in which one or more aspects of the present invention may be implemented.

FIG. 2 illustrates a pen-based computing system 201 that may be used in accordance with various aspects of the present invention. Any or all of the features, subsystems, and functions in the system of FIG. 1 may be included in the computing system of FIG. 2. Pen-based computing system 201 includes a display surface 202, e.g., a digitizing flat panel display, such as a liquid crystal display (LCD) screen, on which a plurality of windows 203 is displayed. A few terms are defined for ease of explanation. An object is located on the "front" of pen-based computing system 201, when it is in a viewing direction for the display surface 202. An object is located on a "back" of pen-based computing system 201 when it is in a direction opposite of the display surface 202, e.g., opposite of the viewing direction. An object is located on the "side" of system 201 when it is located relative to the edge of display surface 202 between the front and back directions.

Figure 3:
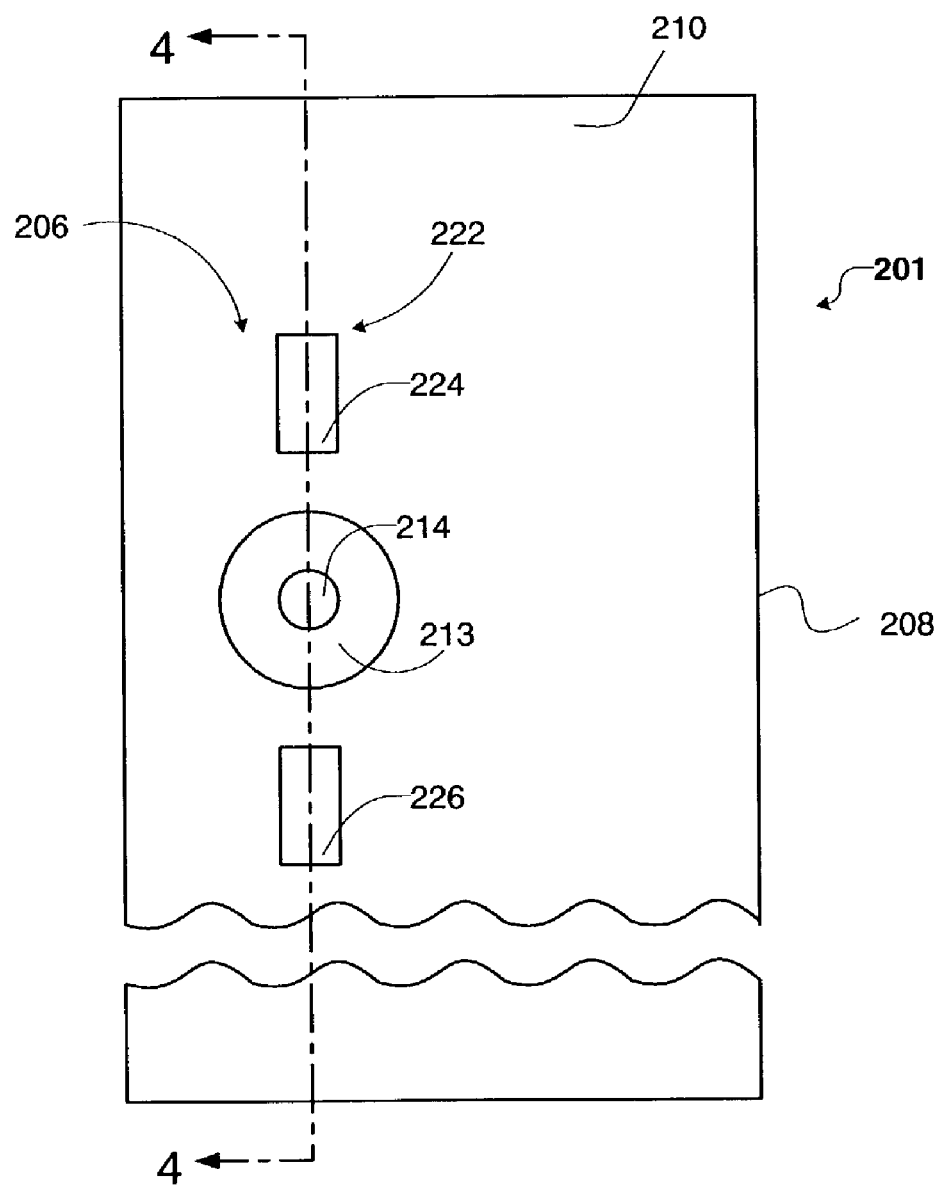
FIG. 3 is a rear plan view of the tablet personal computing environment shown in FIG. 2.

Pen-based computing system 201 includes a housing 208 with a front face 212 and back face 210 (see FIG. 3). Using stylus 204, a user may select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Pen-based computing system 201 interprets gestures made using stylus 204 in order to manipulate data, enter handwriting, create drawings, and/or execute conventional computer application tasks, such as spreadsheets, word processing programs, and the like.

The stylus 204 may be equipped with one or more buttons or other features to augment its selection capabilities. In one example, the stylus 204 may be implemented as a "pencil" or "pen," in which one end constitutes a writing element and the other end constitutes an "eraser" element, and which, when moved across the display surface 202, indicates portions of the display to be erased. Other types of input devices, such as a mouse, trackball, or the like may be used. Additionally, a user's own finger may be the stylus 204 and used for selecting or indicating portions of the displayed image on a touch-sensitive display. Consequently, the term "user input device," as used herein, is intended to have a broad definition and encompasses many variations on well-known input devices, such as the stylus 204.

Referring to FIG. 3, the illustrative pen-based computing system 201 includes a secondary input system 206 mounted to the housing 208. In one aspect, the secondary input system 206 is supplied to reliably enhance the usability of computing system 201 when the stylus 204 is unavailable or otherwise not communicating with the display surface 202. The secondary input system 206 may be usable only when the stylus 204 is not being used, or at all times, as desired. Secondary input system 206 is operatively coupled to the processing unit 110 by way of interface 106. Alternatively, the input system 206 may be operatively coupled directly to the system bus, such as bus 130, via an appropriate interface (not shown).

As shown in FIG. 3, to provide effective ergonomic considerations for the user, the secondary input system 206 may be disposed in an opposite position of the display surface, such as back face 210 of the housing 208. In one aspect, the pen-based computer system 201 may be embodied as a tablet computer which can be used in an "in use" viewing hand-held position. In one illustrative hand-held position, a user may generally place one of their hands on the housing 208 so as to cradle a lateral side of the computing system 201 for viewing the display surface 202. In this position, the housing 208 may be held between the thumb on the front face 212 and the other four fingers on the back face 210 of the housing 208. In one illustrative arrangement, secondary input system 206 is disposed at a natural reach distance within normal ranges of hand sizes to take into account ergonomic considerations. To provide a convenient and flexible input system for different users, the secondary input system 206 may be located on the back face 210 to accommodate the left hand or the right hand of the user.

Figure 4:
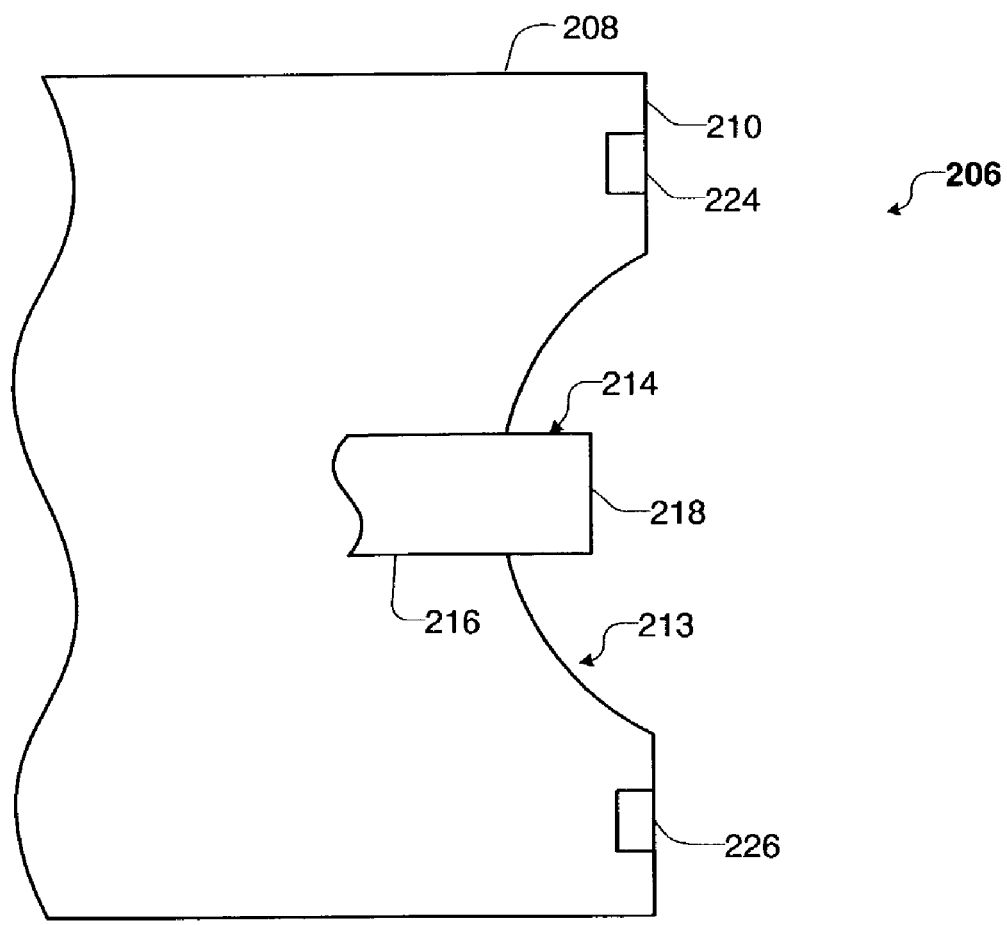
FIG. 4 is a partial section view of the tablet personal computing environment taken along line 4-4 shown in FIG. 3.
Figure 5:
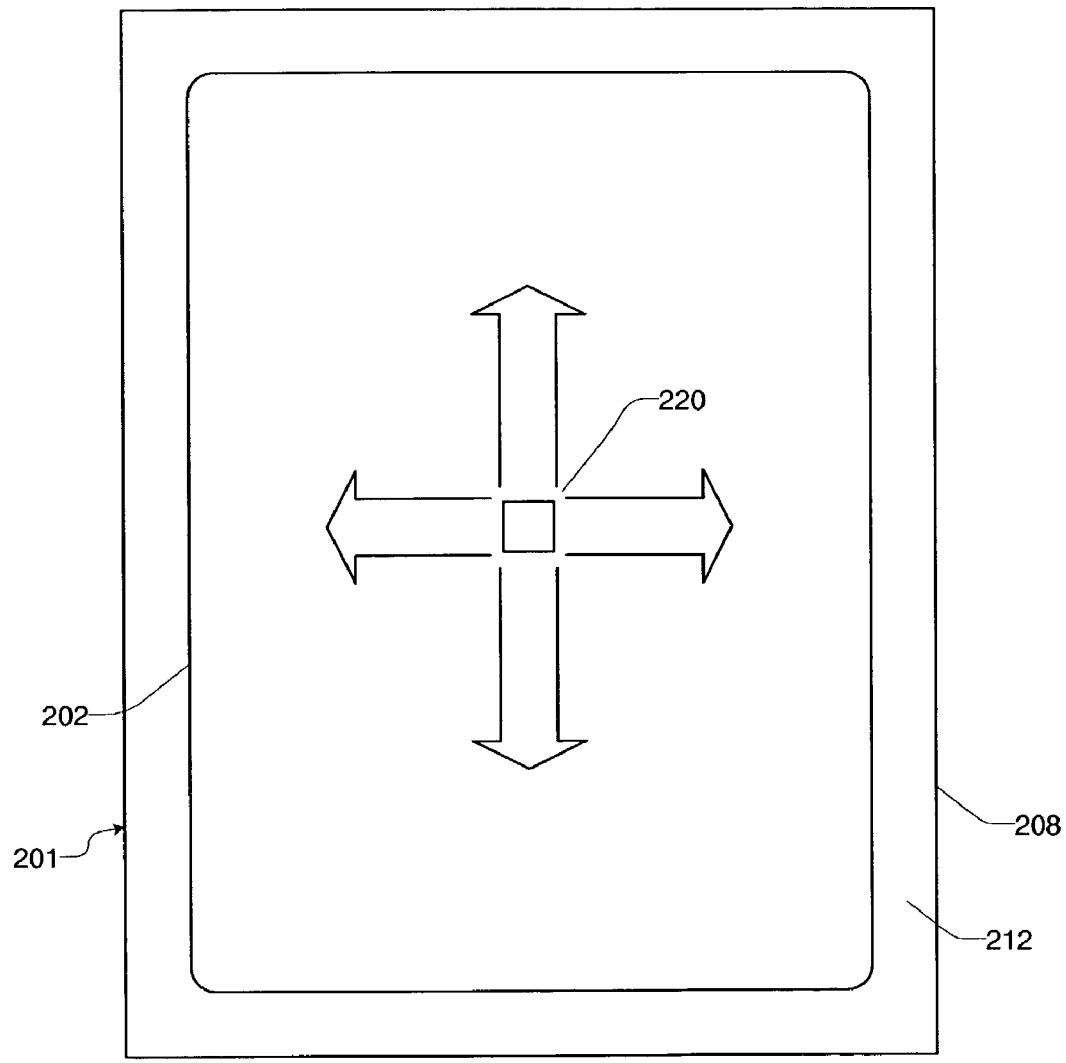
FIG. 5 is a front plan view of the tablet personal computing environment shown in FIG. 2 illustrating directional control of a graphical object with an input system in accordance with one or more aspects of the present invention.

Referring to FIG. 4, in one aspect, the secondary input system 206 may be embodied as a point stick device 214 that includes a control member 216, such as a generally elongated rod that extends generally perpendicular from the housing 208 in its default position. The rod can be made of plastic and covered with a cushioning material, such as foam. The distal end 218 (i.e., the end facing away from the housing 208) of the control member 216 can be engaged or otherwise contacted by a finger of user in the "in use" viewing position or other desirable position. Nevertheless, point stick device 214 may have other shapes and configurations. To control the operation of a graphical user interface on the display surface 202, the point stick device 214 provides similar movements as a computer mouse for freeform two-dimensional motion, e.g., x-y Cartesian coordinates, on display surface 202 (see FIG. 5). In the back face 210 mounting arrangement, a finger of a user, such as the index finger, can apply lateral control forces to the distal end 218 of the point stick device 214. Thus, forces can be processed to correspondingly move a graphical object 220, such as a pointer, about on the display surface 202 in a generally intuitive manner. For example, if a user applies a control force directed to the left direction or right direction of the display surface 202, the graphical object 220 will also to move left or right, respectively, on the display surface 202. Similarly, applying a force directed toward the top direction or bottom direction of the display surface 202 will move the graphical pointer 220 towards the top or bottom of the display surface 202. Of course, the control forces may be applied in other directions, such as diagonally (i.e., top-left or top-right), which will move the pointer 220 in those directions, respectively. It will be appreciated that the secondary input system 206 may alternatively be embodied as a touchpad, a touch strip, a slider, a wheel, a trackball or other device that provides for one or two dimensional movement of graphical pointer 220. In this manner, a user may be provided with an effective secondary or backup utility for the pen-based computing system 201 that can significantly increase the efficiency and the overall usability of system 201.

Referring to FIGS. 3 and 4, the secondary input system 206 may further include one or more buttons, which may be arranged as a button array 222 that includes, e.g., a first button 224 and a second button 226. The respective buttons, when engaged or pressed by a user, may emulate "right-click" and "left-click" events of a conventional mouse (such as in Microsoft WINDOWS® operating software). The click events can be used by the software operating in the pen-based computing device 201. The button array 222 may be mounted proximate to the point stick device 214 within the above noted reach distance. In one aspect, the first button 224 and the second button 226 can be programmed for forward and back operations, respectively, to enable browsing web sites etc. without the stylus 204. Thus, a user is provided with control for objects or the graphical user interface in conjunction with point stick device 214 without the need of the stylus 204.

Figure 6:
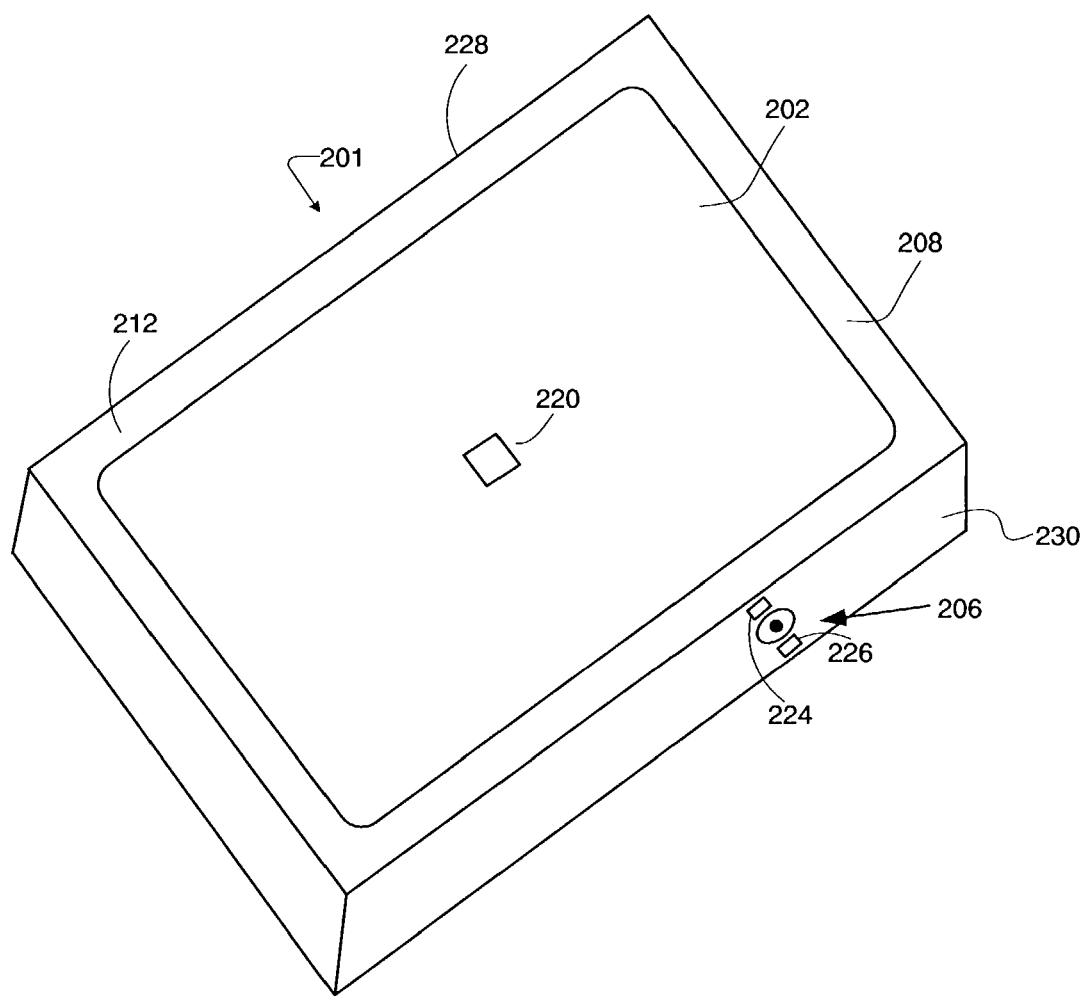
FIG. 6 is a perspective view of the tablet personal computing environment shown in FIG. 2 according to one or more aspects of the present invention.

Referring to FIG. 6, to provide effective ergonomic considerations for the user, the secondary input system 206 may be disposed in or at least partially on a housing side, such as a left side face 228 and/or right side face 230 of the housing 208. In these arrangements, point stick device 214 may extend away from the side faces 228 and/or side face 230. This side mounting arrangement may be particularly useful for electronic book reading and browsing. The pen-based computer system 201 can be placed on a flat surface for viewing, or system 201 can be hand-held in an "in use" viewing position. In one viewing position, a user can place one of their hands on the housing 208 so that at least one of the fingers, such as the index or middle finger, can engage the distal end 218 of point stick device 214. Movement of the point stick 214 directed up and down the side surface, e.g., between front face 212 and back face 210, may be mapped to move the graphical pointer 220 to the left and the right, respectively, on the display surface 202. Likewise, movement of the point stick device 214 to the top or bottom of the display surface 202 will move the graphical pointer 220 towards the top or bottom of the display surface 202. Nevertheless, there are other ways the motion of the pointer could be implemented. Further, the buttons 222 and/or button 224 may be provided above and/or below the point stick device 214. In this arrangement, the index finger of a user can easily move in a sweeping motion from the stick, if a user desires to perform a "right-click" or "left-click" operation.

Referring to FIGS. 3, 4, and 6, in the housing back mount or the side mount arrangement, the point stick device 214 may be disposed in a recessed portion 213 in which the distal end 218 is slightly below or flush with the housing back face 210. In one embodiment, the recessed portion 213 is defined by a concave well structure, which may allow the finger of a user to extend in a generally relaxed position to operate the point stick device 214. While recessed portion 213 is shown with a circular outline and a concave well structure, it will be appreciated that portion 213 can have any outline and shape, such as oval, square, or rectangular. Advantageously, the recessed arrangement reduces the likelihood that the point stick device 214 would be inadvertently engaged by the user's hand, thereby unintentionally moving the pointer 220 or performing some other operation. Further, the recessed position may provide protection of the point stick device from damage.

In one aspect, secondary input system 206 may be configured for automatic activation when the stylus 204 is moved a predetermined and/or threshold distance away from the display surface 202. Likewise, the secondary input system 206 can be automatically placed in an inactive mode responsive to the stylus 204 being proximate to the display surface 202 within a predetermined and/or threshold distance. This arrangement may be useful so as not to confuse a user by inadvertently activating the secondary input system 206 while using the stylus 204.

Figure 7:
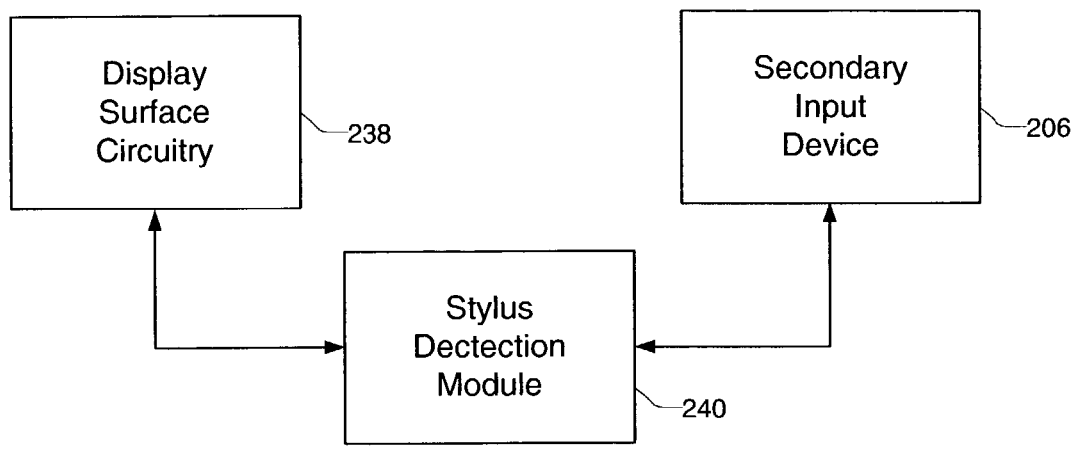
FIG. 7 is a functional block diagram of an illustrative input device control according to one or more aspects of the present invention.

In one arrangement, to accomplish automatic operation, pen-based computing system 201 may include a stylus detection module 240 operatively coupled to the display surface circuitry 238 and the secondary input system 206 (see FIG. 7). The operative coupling may include software, hardware, and/or firmware. Stylus detection module 240 may be configured to detect stylus events associated with the stylus 204 movement (e.g., towards and away from the display surface 202). In one arrangement, the pen-based computing system 201 may be implemented with display surface 202 including an active digitizer, such as an electromagnetic digitizer, and a stylus that communicates with the digitizer. Nevertheless, a digitizer with a proximity sensing arrangement for a stylus may be used with module 240 or a sensor in the front face 212 of housing 208.

Figure 8:
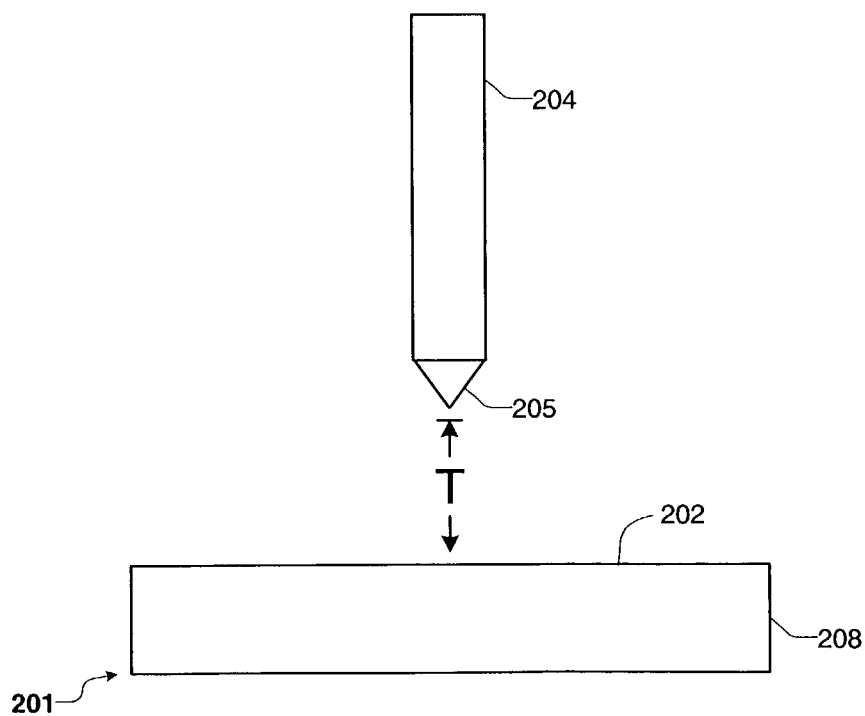
FIG. 8 is a side view of an illustrative tablet personal computing environment having proximity sensing in accordance with one or more aspects of the present invention.

Referring to FIG. 8, display surface 202 with a digitizer may be configured to sense the stylus tip 205 within a threshold distance range denoted as "T", such as within 5 mm or less of the display surface 202. Of course, other distance ranges are possible and the digitizer may sense signal strength and the signal strength may be a function of distance. In this arrangement, when the stylus tip 205 is at a distance greater than the threshold range T, then a stylus out-of-range event may occur. Detection module 240 also detects the when the stylus 204 is absent from the display surface 202 and a corresponding event may occur as well. Nevertheless, the out-of-range event may then invoke a software process which activates the secondary input system 206 for operation so that engagement of the device 206 by the user moves graphical pointer 220 or provide other control of a graphical user interface. Alternatively, a timer may be started when the out-of-range event is generated. Responsive to the timer finishing and/or measuring a particular time delay, the secondary input system 206 may be activated. Purely by way of example, the time delay duration may range between 10-19 seconds, or alternatively, between 20-30 seconds. Nevertheless, other durations are possible for the time delay. In one aspect, the user and/or software may selectively adjust the duration of the time delay.

The time delay feature may be useful to prevent the secondary input system 206 from starting or stopping too many occasions when the user moves the stylus tip 205 numerous times in and out of the upper limit of the threshold range. That is, the time delay feature may provide a predictive nature that the user does not wish to invoke the activation feature, or least not immediately. In one aspect, when the stylus tip 205 is within the threshold range T, a stylus-in-range event may occur. This event indicates that the stylus 204 is being used near or on the display surface 202. Of course, there are many possibilities for designating this type of event. The stylus-in-range event may then invoke a software process to deactivate the secondary input system 206. It will be appreciated that the secondary input system 206 may be activated or deactivated by a user selectable command, hardware or software-button, switch, or other manner.

While aspects of the present invention have been described with reference to a slate type tablet computer, it will be understood that a clamshell type of computer, such as a convertible notebook computer, may be used without departing from the scope of the invention. Thus, the term tablet computer is intended to include tabletize or tablet mode notebooks/laptops which may convert into a tablet for use. In one illustrative example shown in FIGS. 9A-9C, a convertible tablet computer 300 includes a writable display surface 302 and a keyboard 301. Display surface 302 has the same functionality and construction as display surface 201.

Figure 9A:
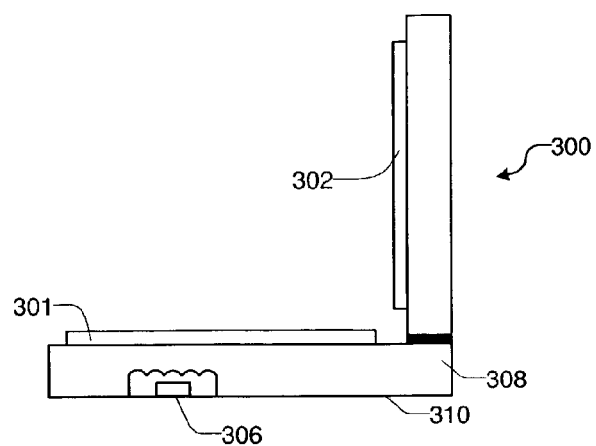
FIGS. 9A-9C are side views of an illustrative convertible tablet personal computing environment with a portion of a housing removed to show components in accordance with the one or more aspects of the present invention.
Figure 9B:
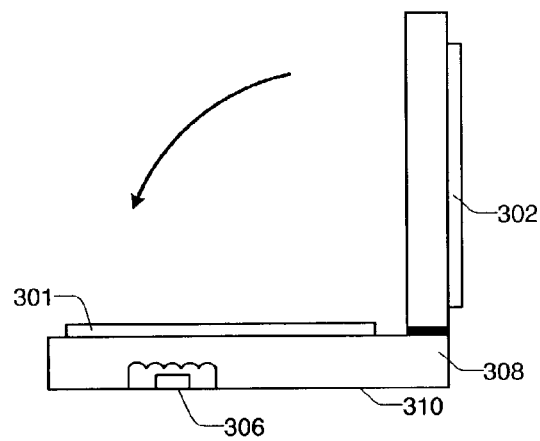
Figure 9C:
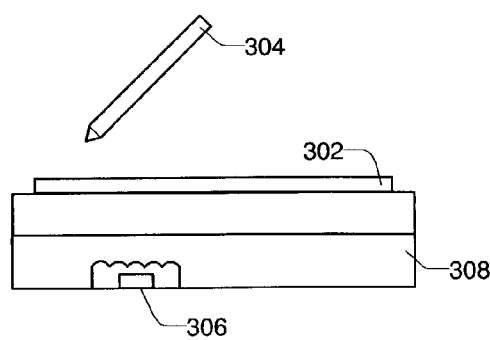

In first position shown in FIG. 9A, computer 300 is used in a notebook mode or a laptop mode with keyboard input. A user may then convert the computer 300 into a tablet mode for writing with a stylus 304. Accordingly, as shown in FIG. 9B, the display screen 302 may be released from the keyboard 301 and rotated into an intermediate position with the display screen 302 facing away from the keyboard 301. As shown in FIG. 9C, the display screen 302 is then placed on top of the keyboard enclosing it to form the tablet mode for use with the stylus 304 and the secondary input system 306.

In this arrangement, the convertible tablet has two housing members or case members for the retaining components, e.g., one housing member for the display screen 302 and the other housing member for the keyboard 302. When in a tablet mode, the housing 308 may be defined by the housing members attached together, albeit, somewhat thicker than a slate type tablet. The secondary input system 306 can be mounted on the bottom of the convertible tablet 300 as shown in FIGS. 9A-9C. Alternatively, input system 306 can be mounted on the side of one of the case members. In another alternative, the input system 306 may be mounted on the housing surface retaining the display screen 302. Hence, the user has the benefits of a tablet computer and has the ability to control the graphical user interface with secondary input system 306.

In sum, a computer system such as a tablet may include a housing and a processor within the housing. A display surface may be attached to one side of the housing in which the display surface is sensitive to input of a pen device. A secondary input system is provided on or in the housing in which input device is responsive to movement of a finger of a user for controlling a graphical user interface operable with the processor. The input system may be disposed at a side of the housing different from the display surface, such as on an opposite side as the display surface or a side surface relative to the display surface. The input system may be a point stick device, a touchpad, or other device that provides one or two-dimensional movement of a graphical object on the display surface. The secondary input system may be automatically invoked based on proximity sensing of the stylus with respect of the display surface. It is also possible to mount the secondary device on the front face at a natural finger reach position to reduce discomfort during handheld use.

It should also be recognized that the secondary input system 206 can be used not only to control a cursor or other graphical object, but additionally or alternatively used to scroll, pan, zoom, and/or the like for graphical objects on the display surface. For instance, where the secondary input system 206 includes, a touch strip or a scrolling wheel, it may be desirable to control scrolling with the input system.

Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

The invention claimed is:

1. A computer system, comprising:
   a housing having a front face and an opposing rear face;
   a processor within the housing;
   a display screen attached to the housing at the front face in which the display screen is sensitive to input of a stylus; and
   an input device being at least partially disposed at the rear face of the housing so that the input device is opposite of the display screen, the input device being different from the stylus, the input device being responsive to movement of a user for two-dimensional pointing on the display screen so as to control a graphical user interface configured to operate with the processor, the input device being configured to be rendered inactive responsive to the stylus being less than a threshold distance away from the display screen.

2. The computer system in accordance with claim 1, in which the input device is configured to provide movement of a graphical object for the display screen.

3. The computer system in accordance with claim 2, in which the input device includes a control member being sensitive to a force applied thereon by a finger of the user.

4. The computer system in accordance with claim 3, in which the control member extends away from the housing surface.

5. The computer system in accordance with claim 2, in which the input device comprises a point stick device having a finger control end.

6. The computer system in accordance with claim 5, in which the input device further comprises a button for simulating a click event.

7. The computer system in accordance with claim 5, in which the finger control end of the point stick device is in a recessed position relative to the housing surface.

8. The computer system in accordance with claim 2, in which the input device comprises a touchpad device.

9. The computer system in accordance with claim 8, in which the touchpad device is recessed in the housing surface.

10. The computer system in accordance with claim 1, in which the input device is mounted in a recessed position on the housing surface.

11. The computer system in accordance with claim 1, in which the housing is defined by mating housing members configured to form a tablet computer.

12. A computer system, comprising:
    a housing;
    a processor within the housing;
    a display screen attached to the housing in which the display screen is sensitive to input of a stylus; and
    an input device being at least partially disposed on a housing surface opposite of the display screen, the input device being responsive to movement of a finger of a user for controlling a graphical user interface configured to operate with the processor; and
    a detection component configured to detect the presence of the stylus within a threshold distance relative to the display screen, the detection component deactivating the input device responsive to the presence of the stylus.

13. The computer system in accordance with claim 1, farther including a detection component is configured to detect the absence of the stylus within a threshold distance relative to the display screen, the detection component activating the input device responsive to the absence of the stylus.

14. A computer system, comprising:
    a housing, the housing having a housing front surface and a housing side surface;

a processor;

a display surface being responsive to a writing implement for permitting input to the processor, the display surface being disposed at the housing front surface;

a pointing system having a control portion being engagable by a finger of a user so as to control a graphical user interface for the display surface, and the control portion being disposed at the housing side surface relative to the display surface, the pointing system permitting the user to control the graphical user interface; and a detection component, the detection component being operable to determine the presence of writing implement within a threshold distance from the display surface for deactivating the pointing system; and the detection component being operable to determine the absence of the writing implement within a threshold distance from the display surface for activating the pointing system.

15. The computer system in accordance with claim 14, in which the pointing system permits freeform motion of a graphical object for the display surface.

16. The computer system in accordance with claim 14, in which the pointing system is deactivated responsive to the movable implement being a threshold distance away from the display surface.

17. The computer system in accordance with claim 14, in which the control portion is mounted in a depression portion in the housing side surface relative to the display surface.

18. The computer system in accordance with claim 14, in which the pointing system comprises a stick device.

19. The computer system in accordance with claim 18, in which the pointing system further comprises a finger button to the stick device.

20. The computer system in accordance with claim 19, in which the stick device is in a recessed position relative to the housing side surface.

21. The computer system in accordance with claim 14, in which the pointing system is deactivated responsive to detecting the writing implement.

22. The computer system in accordance with claim 14, in which the housing side surface is disposed on a left side of the housing relative to the display surface.

23. The computer system in accordance with claim 14, in which the housing side surface is disposed on a right side of the housing relative to the display surface.

24. The computer system in accordance with claim 14, in which the housing is formed by mating case members so that the display surface is attached to one of the case members for a tablet mode.

25. A portable computer system, comprising:

a housing;

a processor;

a display screen being sensitive to a control implement being movable, said control implement having a communicating end for the display screen;

a user input device mounted to the housing, the user input device being controllable with a finger of a user for controlling a graphical object for the display screen; and a memory configured to store computer executable instructions, wherein said instructions cause the computing device to perform the following steps:

sensing the communicating end of the control implement within a threshold range distance as measured from the display screen; and responsive to said sensing, deactivating the user input device.

26. The portable computer system in accordance with claim 25, in which the user input device is configured for one-dimensional movement of the graphical object for the display screen.

27. The portable computer system in accordance with claim 25, in which the user input device is configured for two-dimensional movement of the graphical object for the display screen.

28. The portable computer system in accordance with claim 27, further including a housing surface having the display screen attached, the housing surface including the input device being at least partially disposed thereon.

29. The portable computer system in accordance with claim 25, further including a housing having a housing back, the user input device being disposed on the housing back permitting a user to hold the housing and operate the user input device with a finger.

30. The portable computer system in accordance with claim 25, further including a housing having a housing side, the user input device being disposed on the housing side.

31. The portable computer system in accordance with claim 30, in which the user input device comprises a pointing device.

32. A portable computer system, comprising:

a housing;

a processor;

a display screen being sensitive to a control implement being movable, said control implement having a communicating end for the display screen;

a user input device mounted to the housing operable with a finger of a user for controlling a graphical user interface; and a memory configured to store computer executable instructions, wherein said instructions cause the computing device to perform the following steps:

sensing the absence of the communicating end of the control implement within a threshold distance from the display screen; and responsive to said step of sensing, activating the user input device, the user input device being different from the control implement.

* * * * *